(No Model.)
S. S. BOLTON.
Attachment to Spoon Handles.
No. 230,461. Patented July 27, 1880.
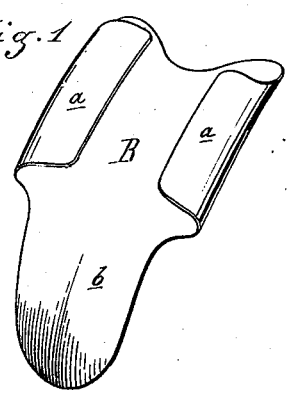
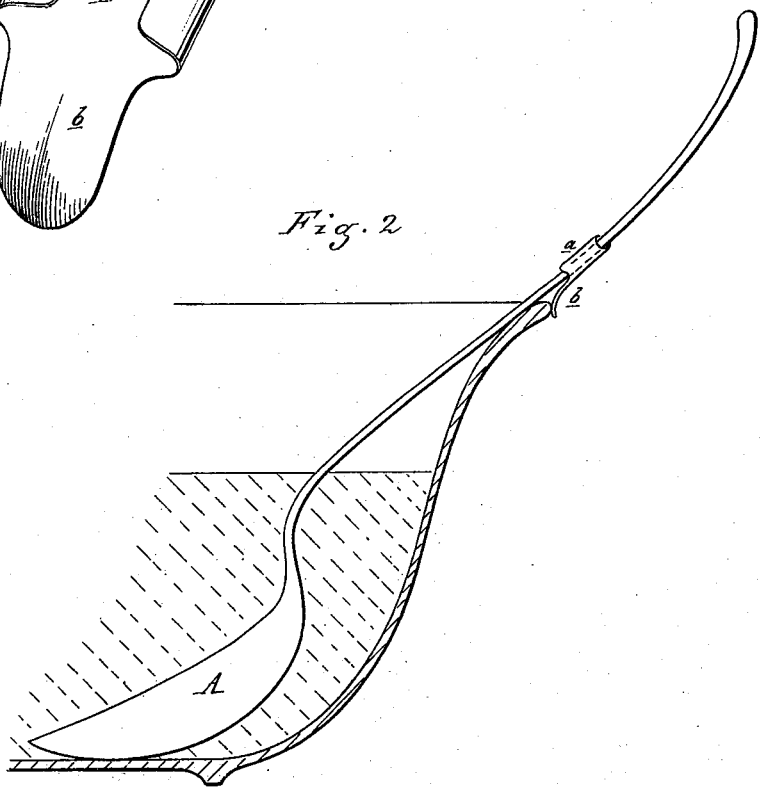
Attest:
A. Barthel
Theo. S. Day
Inventor:
Samuel S Bolton
per T. J. W. Robertson
Attorney

UNITED STATES PATENT OFFICE.

SAMUEL S. BOLTON, OF BIG RAPIDS, MICHIGAN.

ATTACHMENT TO SPOON-HANDLES.

SPECIFICATION forming part of Letters Patent No. 230,461, dated July 27, 1880.

Application filed March 12, 1880. (No model.)

*To all whom it may concern:*

Be it known that I, SAMUEL S. BOLTON, of Big Rapids, in the county of Mecosta and State of Michigan, have invented an Improvement in Attachments to Spoon-Handles, of which the following is a specification.

The nature of this invention relates to new and useful improvements in devices to be attached to spoon-handles, by means of which they may be hung upon the edge of a kettle or pan to prevent them from falling into the kettle or its contents.

The invention consists in the peculiar construction of a hook-slide which embraces the handle of the spoon, all as more fully hereinafter set forth.

In the accompanying drawings, Figure 1 is a perspective of my device. Fig. 2 illustrates the use of my device when attached to a spoon.

In the drawings which form a part of this specification, A represents a spoon, to the handle of which is attached my hook-slide B. This slide B is a V-shaped piece of thin metal, the two upper corners or ears, $a$, of which are turned over and embrace the edges of the spoon-handle, while the lower ear, $b$, is slightly bent outward.

When using a spoon provided with one of these devices in a kettle which is nearly full, the spoon need not be removed, but may be hung upon the edge of the kettle by means of the ear $b$ of the slide.

What I claim as my invention is—

In combination with a spoon, the slide B, provided with the ears $a$ $b$, substantially as and for the purposes set forth.

SAMUEL S. BOLTON.

Witnesses:
C. C. FULLER,
W. L. ROBERTS.